2 Sheets—Sheet 1.

W. VOGLER.

SEAT OR CUSHION.

No. 11,508. Reissued Oct. 15, 1895.

Witnesses.
E. L. Harlow.
L. H. Brown.

Inventor.
William Vogler
By J. S. Rusk
Atty.

W. VOGLER.

SEAT OR CUSHION.

No. 11,508. Reissued Oct. 15, 1895.

Witnesses.
E. L. Harlow
L. H. Frost

Inventor.
William Vogler
By J. S. Rusk
Atty

UNITED STATES PATENT OFFICE.

WILLIAM VOGLER, OF SOMERVILLE, MASSACHUSETTS, ASSIGNOR TO THE AMERICAN METALLIC CUSHION COMPANY, OF WEST VIRGINIA.

SEAT OR CUSHION.

SPECIFICATION forming part of Reissued Letters Patent No. 11,508, dated October 15, 1895.

Original No. 527,633, dated October 16, 1894. Application for reissue filed July 31, 1895. Serial No. 557,772.

*To all whom it may concern:*

Be it known that I, WILLIAM VOGLER, of Somerville, county of Middlesex, State of Massachusetts, have invented an Improvement in Seats or Cushions, of which the following description, in connection with the accompanying drawings, is a specification, like letters and figures on the drawings representing like parts.

This invention has for its object the production of a seat or cushion adapted for use in connection with furniture, chairs, &c., where spring or upholstered seats are employed, and is an improvement upon the class of seat or cushion represented in my application, Serial No. 481,816, filed on the 29th day of July, 1893.

The cushion described in the application referred to consists, essentially, of three frames connected by springs, one of the frames cooperating with said springs being free to yield or expand by pressure applied to the cushion to collapse the same.

In this present invention I have made the supporting-rods, one or more, from coiled springs, and have provided a base for the supporting-rods, and have made other improvements which will be hereinafter described.

Among other uses to which the seat herein to be claimed may be put is that for chair and furniture seats to take the place of ordinary coiled springs, my improved seat presenting an edge which, when covered, affords a yielding edge above the usual side puffing.

Figures 1, 2, 3, 6:
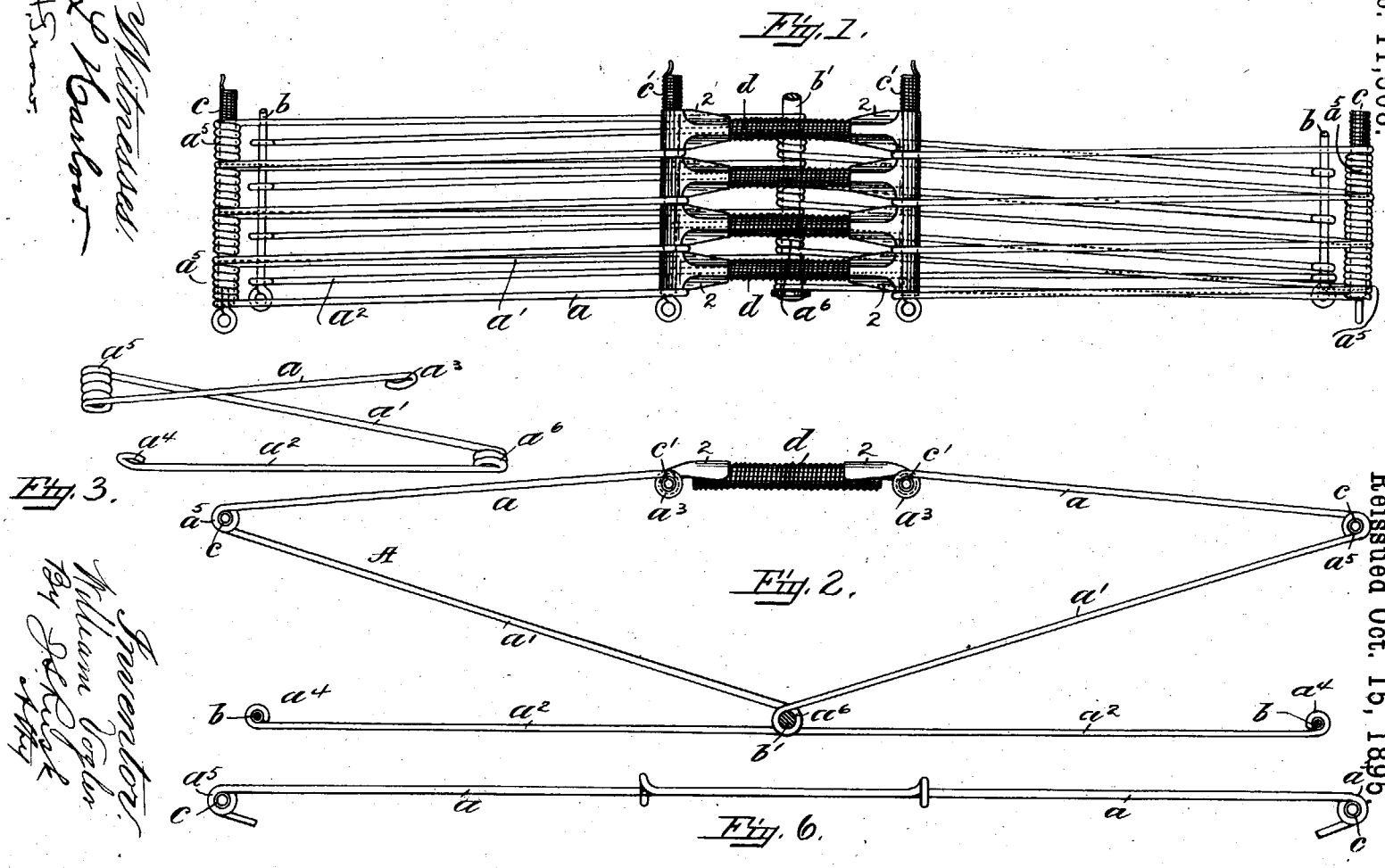
Figure 4:
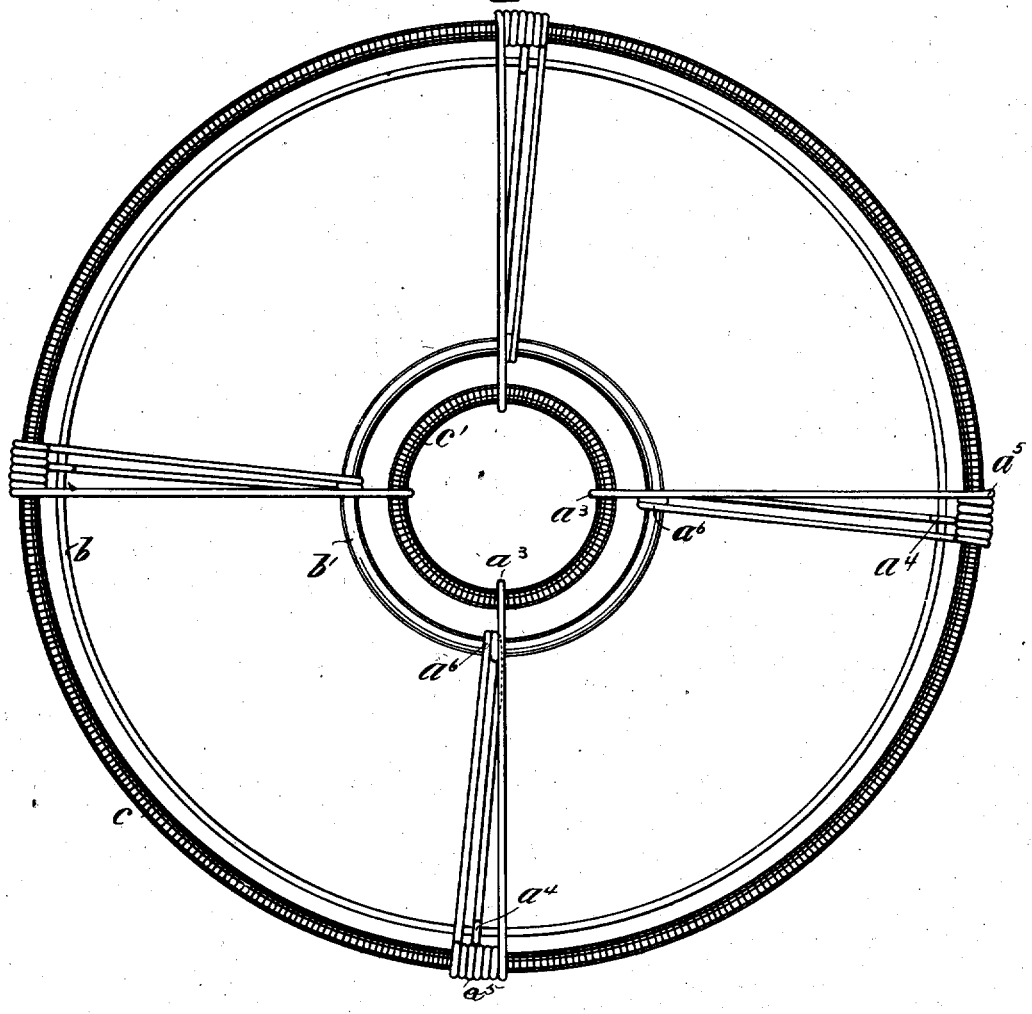
Figure 5:
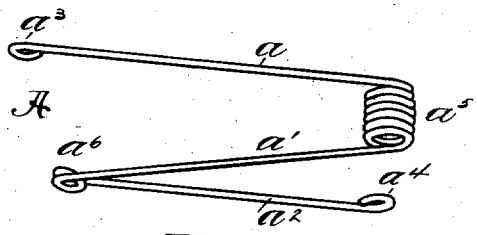

Figure 1, in plan view, shows a sufficient portion of a seat to enable my invention to be understood. Fig. 2 is a side elevation thereof. Fig. 3 shows one of the springs detached. Figs. 4 and 5 show parts of a modified form of seat, and Fig. 6 yet another modification.

The seat shown in Figs. 1 and 2 is of a shape suitable for a lounge or sofa—that is, it is supposed to be longer than it is wide; but the particular outline or shape of the seat may be varied at will without departing from my invention, as it will be obvious from the description hereinafter contained that the independent or individual springs may be arranged in connection with supporting rods or bars of any shape.

My improved seat is composed, essentially, of a series of wire springs A, having preferably three branches $a$ $a'$ $a^2$, the free extremity of the branch $a$ being coiled to form an eye $a^3$, while the free extremity of the branch $a^2$ is bent to form an eye $a^4$, the wire at the junction of the arms $a$ $a^2$ with the portion $a'$ being coiled into the form of springs, as at $a^5$ $a^6$.

The loops or eyes $a^4$ are entered by a bar or rod $b$, preferably a rigid wire, and the spring coils $a^6$ are entered preferaby by a wire or rod $b'$.

The spring coils $a^5$ are entered by coiled wire springs $c$ and the eyes $a^3$ by coiled wire springs $c'$, and, as represented in Figs. 1 and 2, the coiled springs $c'$, located at and about the middle of the seat, are further united by elastic or spring links $d$, shown also as coiled wire springs, attached to buckles or hooks 2 2, which engage the said coiled wire springs $c'$.

In the use of my invention the portions of the seat indicated by the rods $b$ $b'$ $b^2$ will have a firm foundation on a suitable frame of desired construction, and a weight applied to the top of the seat will depress the same, the top of the seat, composed chiefly of the arms $a$, and, as represented, of the spring-links $d$, yielding under the weight upon it, and at the same time the wire springs $c$ $c'$ yield more or less or bend to conform to the weight or to the requirements of the weight, thus making a very easy, flexible, but strong seat.

The seat may be covered with upholstery and a suitable amount of hair or other wadding, and the portions of the seat represented by the coils $a^5$ and coiled spring $c$ and coils $a^4$ and rod $b$ may be spanned by a strip or binding of flexible material, such as commonly designated in upholstery as the "puffing" at the front of a seat, the coils $a^5$ when covered constituting a round flexible edge, such as required in first-class upholstery.

It will be understood that I do not limit my invention to the shape of the seat or cushion. Instead of the springs A and their connecting or supporting rods being arranged to form a rectangular seat, they may be arranged to form a circular seat, as shown in Fig. 4, in which the coils $a^5$ of the springs A are entered by or strung upon a circular coiled spring $c$, the coils $a^4$ being entered by or strung upon a circular rod $b$, and the inner coils $a^3$ and $a^6$ of said springs A are entered by or strung upon a circular coiled spring $c'$ and a circular rod $b'$, respectively.

In the modification Fig. 4 the spring-links $d$ of Fig. 1 are omitted, as they may be, for that shape of cushion or seat, it being applicable for round-seated railway-chairs, &c.

In view of the above description I denominate the springs $c$ and $c'$ and the rods $b'$ as a "supporting-frame," the rod or rods $b$ serving as a foot-holder for the arms $a^2$, constituting the bottom of the seat.

In the modification Fig. 6, instead of employing the yielding links $d$ and the spiral springs $c'$, I have made the arms $a$ $a$ longer, so as to overlap, and have provided the ends of said arms with eyes turned over from the side, so that the eyes of each of said arms will embrace the other arm and slide thereon when weight is applied to the top of the seat.

Having described my invention, what I claim as new, and desire to secure by Letters Patent, is—

1. A seat or cushion composed of a series of three-armed springs, each containing between its ends two spring coils, a supporting frame for said three-armed springs comprising rods and coiled springs which are extended through said spring coils, a foot-holder to which the ends of one of the arms of said springs are connected, and connecting means between the arms of said springs, which arms constitute the top of the seat or cushion, substantially as described.

2. A seat or cushion composed of a series of three-armed springs, each containing in its bends between its ends spring coils, and a supporting frame for said three-armed springs comprising rigid rods and coiled springs which are extended through said spring coils, substantially as described.

3. A seat or cushion composed of a series of three-armed springs, each containing between its ends spring coils, and its free ends terminating in eyes, and a supporting frame for said three armed springs comprising rigid rods and coiled springs upon which said three-armed springs are strung by passing said rods and coiled springs through the spring coils and eyes, substantially as shown and described.

4. A seat or cushion composed of a series of three-armed springs, each containing between its ends spring coils, and its free ends terminating in eyes, a supporting frame for said three-armed springs comprising rigid rods and coiled springs upon which said three-armed springs are strung by passing said rods and coiled springs through the spring coils and eyes, and connecting spring links for the upper free ends of said three-armed springs, substantially as described.

5. A seat or cushion composed of a supporting frame, comprising rods or bars, one or more of which are composed of coiled springs, a suitable foot-holder composed of a rigid rod, and a series of three-armed springs provided with coils and eyes by which they are strung upon said supporting frame and foot-holder, the coiled springs of said supporting frame engaging the uppermost coils and eyes of the three-armed springs, substantially as shown and described.

6. In a seat or cushion, a series of spring wires having a coil between the ends thereof, a flexible support to which the upper ends of said spring wires are connected, and a flexible support to which said spring wires are connected located in the said coils of the said spring wires, both of said flexible supports being adapted to yield under the action of weight upon said seat or cushion.

7. A seat or cushion composed of a series of spring wires, a flexible support to which the upper end of each spring wire is connected, a coil located between the ends of each spring wire and forming the edge of said seat or cushion, and a flexible support to which said spring wires are connected located in the said coil of each spring wire and adapted to yield under the action of weight upon said seat or cushion.

8. A seat or cushion composed of a series of spring wires, a flexible support to which the upper end of each spring wire is connected, a coil located between the ends of each of said spring wires and forming the edge of said seat or cushion, a flexible support to which said spring wires are connected located in the said coil of each spring wire and adapted to yield under the action of weight upon the seat or cushion, and a support to which the lower end of each spring wire is connected.

9. In a seat or cushion, a series of spring wires bent between the ends thereof, a support for said spring wires located in said bends and elastic supporting means for the upper ends of said spring wires adapted to yield to the movement of said spring wires under the action of weight upon said seat or cushion.

10. In a seat or cushion, a series of spring wires bent between the ends thereof to form the edge of said seat or cushion and arranged in rows, a flexible support for each row to which the upper ends of said spring wires of the same row are connected, a flexible support for each row located in the said bends of the said spring wires, and flexible connections between the upper flexible supports to which the upper ends of said spring wires are connected.

11. In a seat or cushion, a series of spring wires bent between the ends thereof to form the edge of said seat or cushion and arranged in rows, a flexible support for each row to which the upper ends of said spring wires of the same row are connected, a flexible support for each row located in the said bends of the said spring wires, a support to which the lower ends of said spring wires are connected, and flexible connections between the upper flexible supports to which the upper ends of said spring wires are connected.

12. In a seat or cushion, a series of spring wires bent between the ends thereof, flexible supporting means for said spring wires located in said bends and adapted to yield to the movement of said spring wires under the action of weight upon said seat or cushion, and means for supporting the free ends of said spring wires.

13. In a seat or cushion, a series of spring wires bent between the ends thereof, flexible supporting means for said spring wires located in the said bends and adapted to yield to the movement of said spring wires under the action of weight upon said seat or cushion, a support for the upper free ends of said spring wires and a support for the lower free ends of said spring wires.

14. In a seat or cushion, a series of spring wires bent between the ends thereof, a flexible support for said spring wires located in said bends, flexible supporting means for the upper ends of said spring wires adapted to yield to the movement of said spring wires under the action of weight upon said seat or cushion, and a support for the lower ends of said spring wires.

In testimony whereof I have signed my name to this specification, in the presence of two subscribing witnesses, on this 27th day of July, A. D. 1895.

WILLIAM VOGLER.

Witnesses:
L. H. TROW,
E. L. HARLOW.